(12) United States Patent
Mano

(10) Patent No.: US 8,753,247 B2
(45) Date of Patent: Jun. 17, 2014

(54) TWO-WHEELED MOTOR VEHICLE

(75) Inventor: Yasunori Mano, Kyoto (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 458 days.

(21) Appl. No.: 13/264,410

(22) PCT Filed: Apr. 15, 2009

(86) PCT No.: PCT/JP2009/057603
§ 371 (c)(1),
(2), (4) Date: Oct. 14, 2011

(87) PCT Pub. No.: WO2010/119531
PCT Pub. Date: Oct. 21, 2010

(65) Prior Publication Data
US 2012/0035009 A1 Feb. 9, 2012

(51) Int. Cl.
*B60W 10/02* (2006.01)
*B60W 10/06* (2006.01)
*B60W 10/107* (2012.01)

(52) U.S. Cl.
USPC .............................................. 477/39; 477/45

(58) Field of Classification Search
USPC ..................... 477/39, 45, 107, 174
See application file for complete search history.

(56) References Cited

U.S. PATENT DOCUMENTS

| 5,158,163 A * | 10/1992 | Suzuki ........................ 192/3.31 |
| 6,659,901 B2 * | 12/2003 | Sakai et al. ................... 475/218 |
| 7,681,920 B2 * | 3/2010 | Iwasaki ......................... 280/831 |
| 2008/0079285 A1 * | 4/2008 | Ueda et al. ................. 296/180.1 |

FOREIGN PATENT DOCUMENTS

| JP | 05-306755 A | 11/1993 |
| JP | 08-285059 A | 11/1996 |
| JP | 11-082725 A | 3/1999 |
| JP | 2004-144233 A | 5/2004 |

OTHER PUBLICATIONS

Official Communication issued in International Patent Application No. PCT/JP2009/057603, mailed on Jul. 21, 2009.

* cited by examiner

*Primary Examiner* — Edwin A Young
(74) *Attorney, Agent, or Firm* — Keating & Bennett, LLP

(57) ABSTRACT

A motorcycle capable of reducing and minimizing a period of time in which air that is immixed into hydraulic oil due to a vehicle body being inclined in a left-right direction stays in the hydraulic oil, includes an oil pump to feed hydraulic oil to an oil chamber of a primary pulley and an oil chamber of a secondary pulley, and a first control valve. The first control valve includes a discharge port to discharge the hydraulic oil from a first oil passage continuously from the oil pump to the oil chamber. Under normal control, the controller operates the first control valve based on the driving state of the motorcycle. Further, the controller determines whether or not the inclination of the motorcycle exceeds a predetermined threshold, and when the inclination of the motorcycle exceeds the predetermined threshold, the controller operates the first control valve such that the discharge port is prevented from being closed.

9 Claims, 8 Drawing Sheets

TWO-WHEELED MOTOR VEHICLE

BACKGROUND OF THE INVENTION

1. Field of the Invention

The present invention relates to a technique, for use in a motorcycle that controls a belt-type continuously variable transmission by hydraulic pressure to discharge hydraulic oil containing air that is immixed therein due to inclining of the motorcycle in the left-right direction.

2. Description of the Related Art

Conventionally, there are available belt-type continuously variable transmissions that are controlled by hydraulic pressure (e.g., Japanese Patent Laid-open Publication No. Hei11-82725). In such a continuously variable transmission, an oil chamber is arranged in each of paired pulleys. Each of the pulleys sandwiches the belt by hydraulic pressure. An oil passage is connected to the oil chamber of each pulley, and is provided with a control valve that is controlled based on a driving state of the vehicle, such as, e.g., a throttle opening degree and a vehicle speed. Some of such control valves open and close a discharge port for discharging the hydraulic oil in the oil passage so that the hydraulic pressure becomes equal to a pressure according to a signal from the controller. When a pulley needs a large clamping force (a force for sandwiching the belt), such as when, e.g., a large torque is input to the continuously variable transmission, the control valve reduces the discharge amount of hydraulic oil by closing the discharging port, to thereby increase the hydraulic pressure in the oil passage.

However, a motorcycle equipped with such a hydraulic pressure-controlled continuously variable transmission has a problem described below. The motorcycle may be largely inclined in the left-right direction, and in such a case, the surface of the hydraulic oil in the oil sump will vary in its height such that the inlet of the oil pump emerges out of the hydraulic oil. Consequently, air may be sucked by the oil pump together with the hydraulic oil to be immixed into the hydraulic oil in the oil passage. This makes it difficult to produce a sufficient hydraulic pressure.

In connection with this problem, when the discharge port is open after the motorcycle returns to its original upright posture, the air-mixed hydraulic oil is gradually discharged from the oil passage through the discharge port while the oil pump newly supplies hydraulic oil into the oil passage. However, when the above described control based on a driving state of the motorcycle is carried out after the motorcycle returns to its normal, upright posture and the discharge port is thus closed, the hydraulic oil cannot be readily discharged from the oil passage. Consequently, the air-mixed hydraulic oil will stay in the oil passage for a longer period of time.

SUMMARY OF THE INVENTION

In view of the above, preferred embodiments of the present invention provide a motorcycle that reduces a period of time that air-mixed hydraulic oil stays in an oil passage.

In order to solve the above described problems, a motorcycle according to a preferred embodiment of the present invention includes an engine and a continuously variable transmission. The continuously variable transmission includes a primary pulley having an oil chamber, sandwiching a belt by hydraulic pressure of the oil chamber and receiving torque from the engine, and a secondary pulley having an oil chamber, sandwiching the belt by hydraulic pressure of the oil chamber and receiving the torque from the primary pulley. Further, the motorcycle includes an oil pump that feeds hydraulic oil to the oil chamber of the primary pulley and to the oil chamber of the secondary pulley, and a valve including a discharge port that discharges the hydraulic oil from an oil passage continuously from the oil pump to at least one of the oil chambers, to open and close the discharge port. The motorcycle further includes a controller that performs control, as a normal upright posture control, to operate the valve based on a driving state of the motorcycle. The controller includes an inclination determination section that determines whether or not inclination of the motorcycle exceeds a predetermined threshold, and when the inclination of the motorcycle exceeds the predetermined threshold, the controller carries out discharge promoting control to operate the valve such that the discharge port is prevented from being closed.

According to a preferred embodiment of the present invention, when the inclination of the motorcycle exceeds a predetermined threshold, the discharge port is prevented from being closed. This significantly reduces and minimizes a period of time that air-mixed hydraulic oil stays in an oil passage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
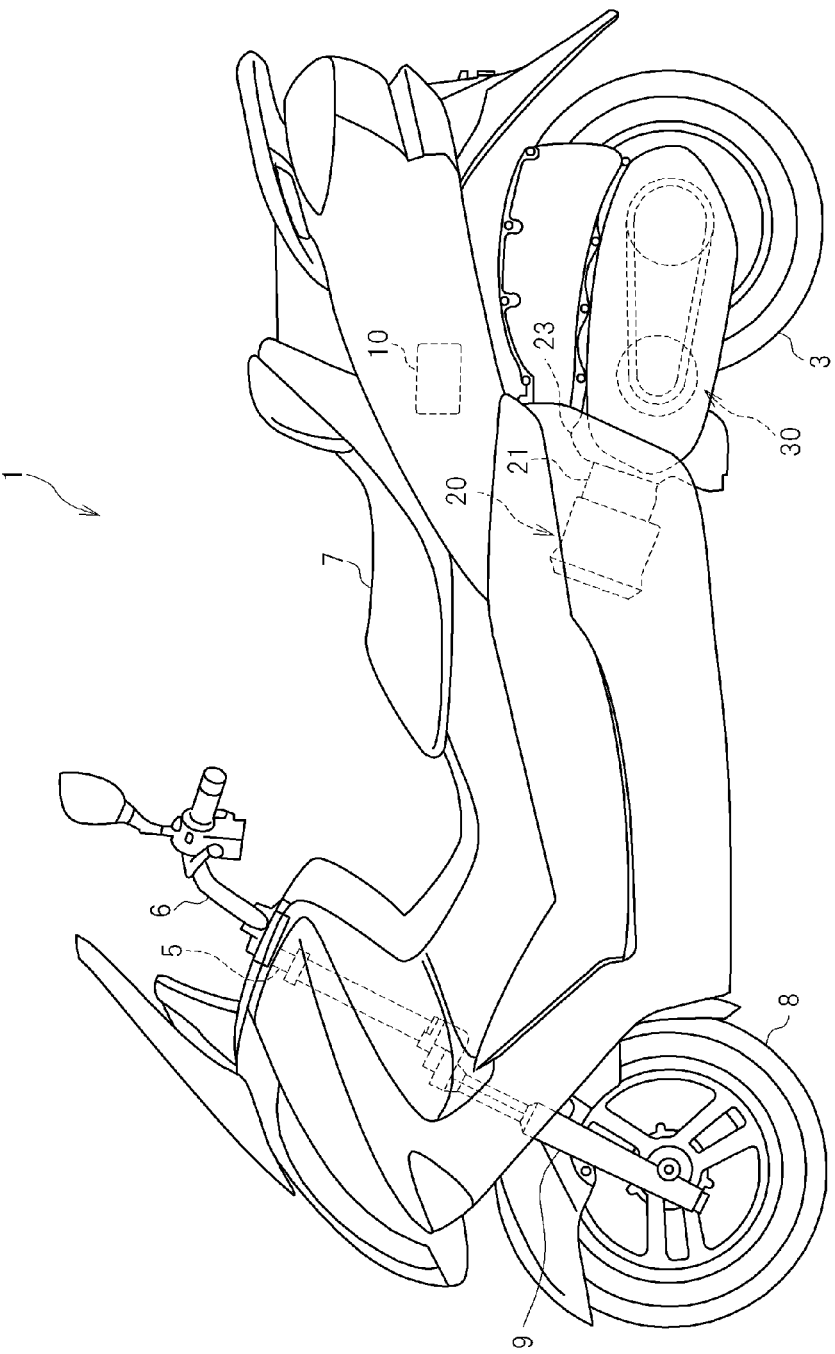
FIG. 1 is a side view of a motorcycle according to a preferred embodiment of the present invention.
Figure 2:
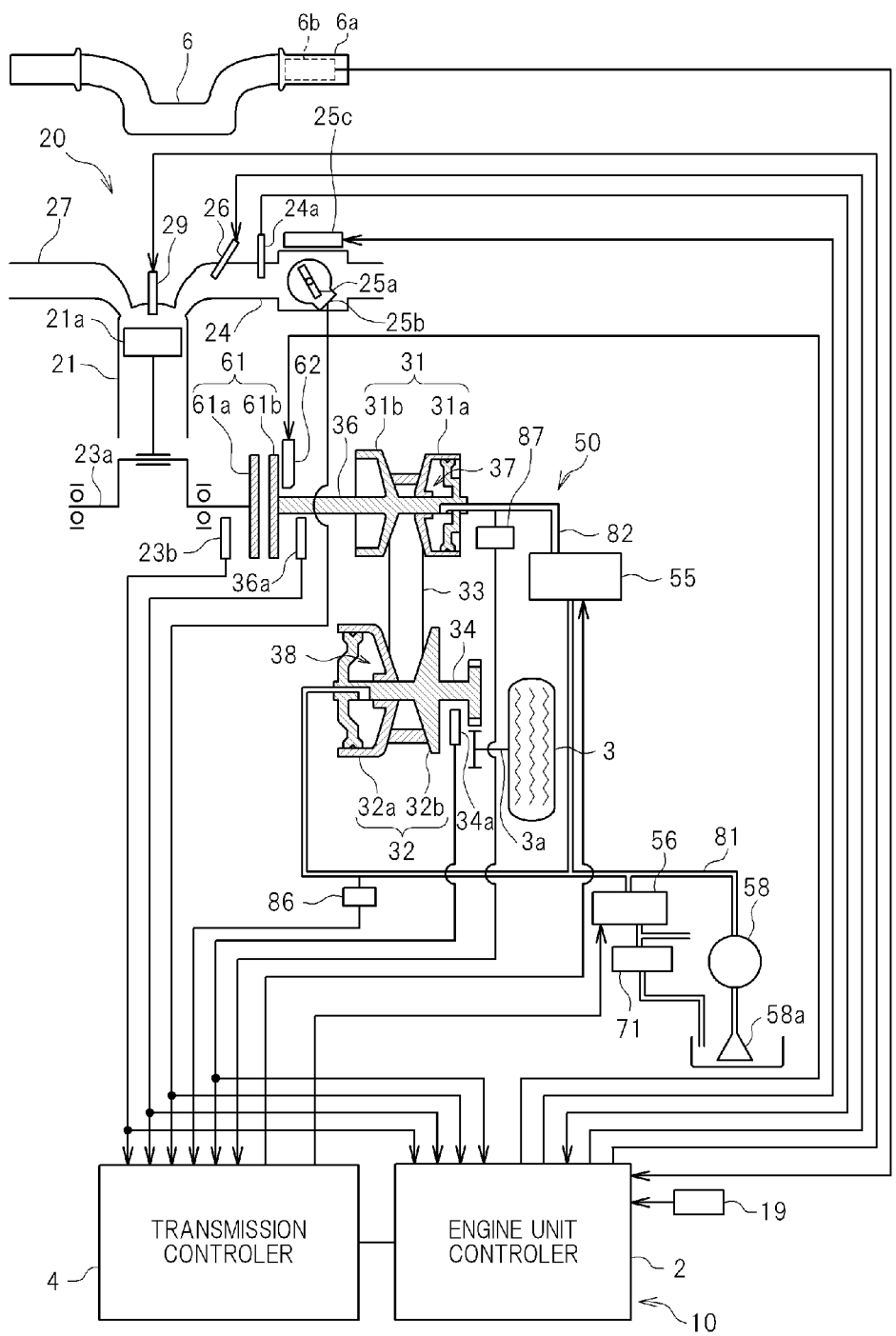
FIG. 2 is a schematic diagram of an engine, a continuously variable transmission, and a controller of the motorcycle of FIG. 1.

In the following, preferred embodiments of the present invention will be described with reference to the accompanying drawings. FIG. 1 is a side view of a motorcycle 1 which is an example of a preferred embodiment of the present invention. FIG. 2 is a schematic diagram of a controller 10, an engine 20, and a continuously variable transmission 30 of the motorcycle 1.

As shown in FIG. 1 or 2, the motorcycle 1 includes a front wheel 8 and a rear wheel 3. The motorcycle 1 further includes an engine 20, a continuously variable transmission 30 to reduce the speed of the rotation from the engine 20 and transmit the reduced rotation speed to the rear wheel 3, a controller 10 to control the engine 20 and the continuously variable transmission 30, and a hydraulic circuit 50. In this example, the controller 10 preferably includes a transmission controller 4 and an engine unit controller 2.

As shown in FIG. 1, the front wheel 8 is rotatably supported on the lower end of the front suspension 9. A steering shaft 5 is connected to the upper portion of the front suspension 9 so as to turn in the left and right directions. A handle 6 is provided at an upper portion of the steering shaft 5. The handle 6, the steering shaft 5, the front suspension 9, and the front wheel 8 are arranged so as to turn together in the left and right directions, so that operating the handle 6 enables steering of the front wheel 8. The handle 6 includes, on its right side, an accelerator grip 6a capable being rotated by operation of riders.

As shown in FIG. 1, a seat 7 is arranged rearward from the handle 6 so that a rider can straddle the seat 7 to sit thereon. The engine 20 is mounted below the seat 7. The engine 20 includes a cylinder 21 and a crankcase 23. As shown in FIG. 2, an intake pipe 24 is connected to the cylinder 21. The intake pipe 24 is provided with an injector 26 to inject fuel from a fuel tank (not shown) to the cylinder 21.

A throttle body 25 is connected to the intake pipe 24, wherein a throttle valve 25a to adjust the amount of air flowing through the intake pipe 24 is arranged inside the throttle body 25. The air having flown through the throttle body 25 flows further into the cylinder 21 from the intake pipe 24. The throttle valve 25a is an electronically controlled valve, and the throttle body 25 is provided with a throttle actuator 25c to open and close the throttle valve 25a. The throttle actuator 25c includes a motor that works with power supplied from the engine unit controller 2. The engine unit controller 2 adjusts the power for the motor to thereby control a throttle opening degree, that is, the opening degree of the throttle valve 25a.

The cylinder 21 includes a piston 21a arranged therein, which reciprocatingly moves by burning of the fuel ignited by the ignition plug 29. The piston 21a is connected to the crankshaft 23a. The crankshaft 23a rotates by reciprocatingly moving of the piston 21a, whereby the engine 20 outputs torque. A discharge pipe 27 to discharge exhaust gas produced by the fuel burning is connected to the cylinder 21.

A clutch 61 to transmit torque from the engine 20 to the continuously variable transmission 30 or restrict the torque transmission is arranged between the engine 20 and the continuously variable transmission 30, that is, upstream of the continuously variable transmission 30 in the torque transmission path between the engine 20 and the rear wheel 3. The clutch 61 includes a driving member 61a that rotates along with the crankshaft 23a and a driven member 61c that rotates along with a primary shaft 36. When the driving member 61a and the driven member 61c are pressed to each other, that is, the clutch 61 is engaged, torque from the engine 20 is transmitted to the continuously variable transmission 30. Meanwhile, when the driving member 61a and the driven member 61c are spaced apart from each other, that is, the clutch 61 is disengaged, torque transmission is prevented.

In this example, the clutch 61 is engaged or disengaged under control of the engine unit controller 2, and an electromagnetic clutch, a hydraulic clutch or other suitable clutch, for example, may be used as the clutch 61. In this example, the clutch 61 preferably is provided with a clutch actuator which presses the driving member 61a on the driven member 61c and separates the driving member 61a from the driven member 61c. The clutch actuator 62 has a motor that works with power supplied from the engine unit controller 2. In this regard, the clutch 61 is not limited to the above described clutch, but may be a centrifugal clutch having an electronically controllable mechanism.

The continuously variable transmission 30 preferably is a belt-type continuously variable transmission, and includes a primary pulley 31 that rotates integrally with the primary shaft 36 and a secondary pulley 32 that rotates integrally with the secondary shaft 34. The continuously variable transmission 30 includes an annular belt 33 that is wound around the primary pulley 31 and the secondary pulley 32 to transmit the rotation of the primary pulley 31 to the secondary pulley 32. The belt 33 preferably is, e.g., a metallic belt or a resin belt.

The primary pulley 31 includes a movable sheave 31a that is movable in the axial direction of the primary shaft 36 and a stationary sheave 31b facing to the movable sheave 31a in the axial direction. The secondary pulley 32 as well includes a movable sheave 32a that is movable in the axial direction of the secondary shaft 34 and a stationary sheave 32b facing to the movable sheave 32a in the axial direction. The movable sheaves 31a, 32a move in the axial direction and accordingly, the respective intervals between the movable sheaves 31a, 32a and the stationary sheave 31b, 32b are changed, whereby the transmission ratio of the continuously variable transmission 30 is changed.

The secondary shaft 34 is connected to the wheel shaft of the rear wheel 3 through a gear, so that the rotation (torque) transmitted from the primary pulley 31 to the secondary pulley 32 is transmitted to the wheel shaft of the rear wheel 3 through the gear.

The continuously variable transmission 30 is a transmission that is controlled by hydraulic pressure. The motorcycle 1 includes a hydraulic circuit 50. The primary pulley 31 includes an oil chamber (hereinafter referred to as a primary oil chamber) 37, while the secondary pulley 32 has an oil chamber (hereinafter referred to as a secondary oil chamber) 38. The hydraulic circuit 50 includes a first oil passage 81 and a second oil passage 82. The first oil passage 81 is connected to the secondary oil chamber 38, and the second oil passage 82 is connected to the primary oil chamber 37. The movable sheaves 31a, 32a move in the axial direction by receiving hydraulic pressure of the primary oil chamber 37 or the secondary oil chamber 38. The movable sheave 31a, 32a and the stationary sheave 31b, 32b sandwich the belt 33 located therebetween by hydraulic pressure.

Figure 3:
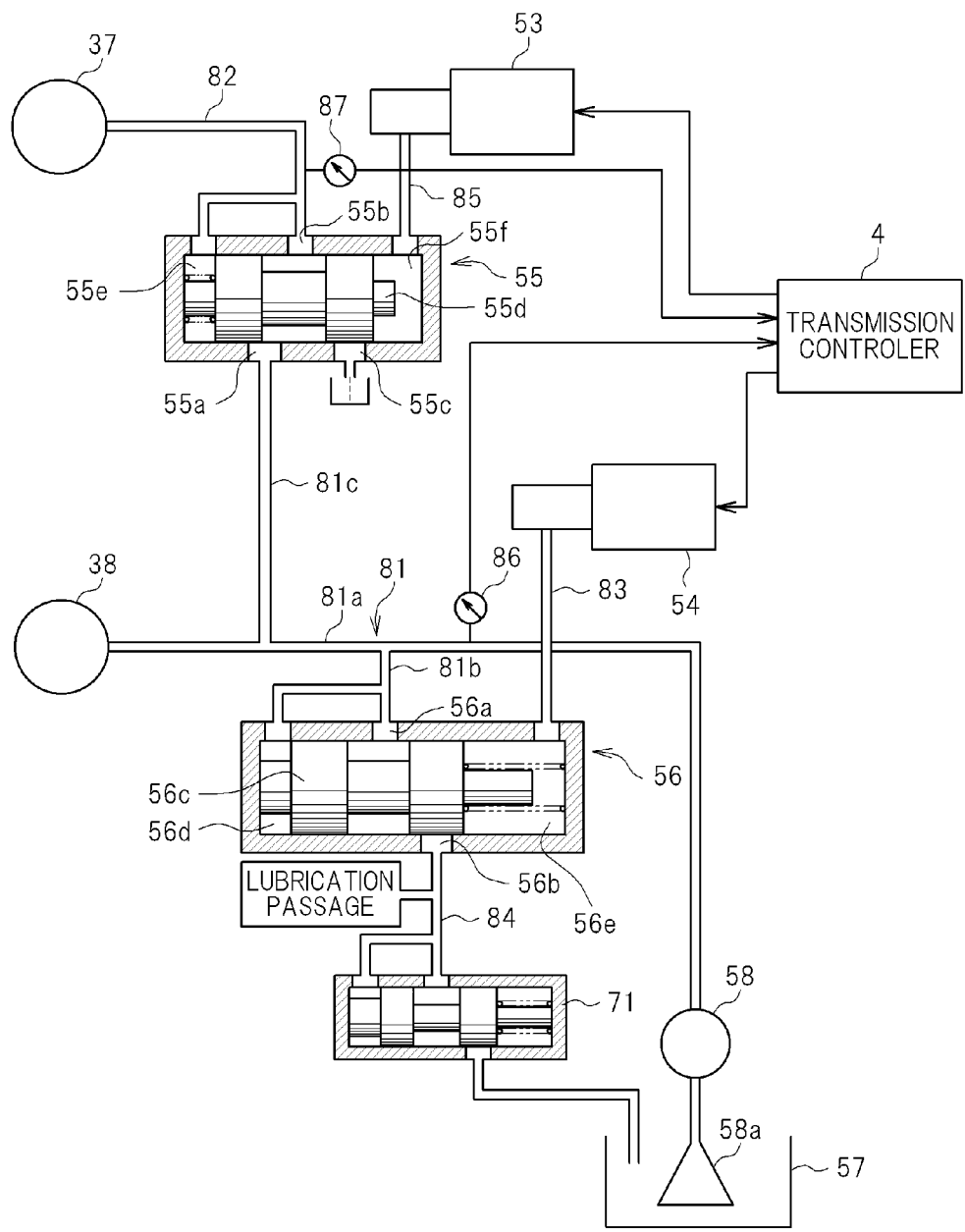
FIG. 3 is a schematic diagram of a hydraulic circuit mounted on the motorcycle of FIG. 1.

FIG. 3 is a schematic diagram showing a structure of the hydraulic circuit 50. The oil pump 58 sucks the hydraulic oil in the oil sump 57 through an inlet 58a including a strainer and feeds the hydraulic oil to the first oil passage 81. The oil pump 58 is connected to a crank shaft 23a through a gear or a chain (not shown) and works along with the rotation of the engine 20. Therefore, the amount of hydraulic oil supplied from the oil pump 58 increases as the rotation speed of the engine 20 increases.

The hydraulic circuit 50 includes a first control valve 56 and a second control valve 55. The first oil passage 81 includes a main oil passage 81a connected to the secondary oil chamber 38, an oil passage 81b branched from the main oil passage 81a to be connected to the first control valve 56, and an oil passage 81c branched from the main oil passage 81a to be connected to the second control valve 55.

The first control valve 56 is a relief valve. The first control valve 56 includes an inlet port 56a to which the oil passage 81b of the first oil passage 81 is connected to receive from the first oil passage 81, the hydraulic oil fed by the oil pump 58. Further, the first control valve 56 includes a discharge port 56b to discharge hydraulic oil from the first oil passage 81. In this example, the spool 56c of the first control valve 56 moves in the first control valve 56 to thereby open and close the discharge port 56b. The spool 56c moves between a position to close the discharge port 56b (hereinafter referred to as a close position (the leftmost position in FIG. 3)) and a position to open the discharge port 56b (hereinafter referred to as an open position (the rightmost position in FIG. 3)), to thereby open and close the discharge port 56b. That is, the spool 56c establishes or restricts communication between the inlet port 56a and the discharge port 56b. Alternatively, the spool 56c may restrict communication between the inlet port 56a and the discharge port 56b by closing the inlet port 56a, to thereby consequently close the discharge port 56b.

The first control valve 56 includes a feedback chamber 56d into which a feedback pressure of the first oil passage 81 is input, and a signal pressure chamber 56e positioned on the opposite side from the feedback chamber 56d across the spool 56c. The hydraulic circuit 50 includes a solenoid valve 54 that works according to an electric current supplied from the transmission controller 4, and the solenoid valve 54 is connected to the signal pressure chamber 56e through an oil passage 83. The solenoid valve 54 inputs, to the signal pressure chamber 56e, a signal pressure according to the electric current supplied from the transmission controller 4.

By opening and closing the discharge port 56b, the first control valve 56 controls the hydraulic pressure in the first oil passage 81 (hereinafter referred to as a line pressure) and the hydraulic pressure in the secondary oil chamber 38 (hereinafter referred to as a secondary pressure). For example, when the signal pressure of the solenoid valve 54, that is, the pressure of the signal pressure chamber 56e, increases and the hydraulic pressure in the feedback chamber 56d becomes relatively lower, the spool 56c is moved toward the close position. This will increase the line pressure and the secondary pressure. Meanwhile, when the signal pressure of the solenoid valve 54 becomes lower, and the pressure in the feedback chamber 56d becomes relatively higher, the spool 56c is moved toward the open position. As a result, the hydraulic oil in the first oil passage 81 is discharged through the discharge port 56b, so that the line pressure and the secondary pressure decrease. Thus, the first control valve 56 controls the line pressure and the secondary pressure according to an electric current output from the transmission controller 4, that is, a signal pressure of the solenoid valve 54.

In this regard, the discharge port 56b in this example is connected with an oil passage 81 connected to a lubrication passage to lubricate the respective parts in the engine 20, and also connected with a lubrication passage pressure adjusting valve 71 to adjust the hydraulic pressure in the lubrication passage. The hydraulic oil discharged from the discharge port 56b flows into the oil sump 57 through the lubrication passage or the lubrication passage pressure adjusting valve 71 to be released in the oil sump 57.

As described above, the second control valve 55 as well is connected to the first oil passage 81. The second control valve 55 includes an inlet port 55a, to which the oil passage 81c branched from the main oil passage 81a is connected. The second control valve 55 has an input/output port 55b, to which the second oil passage 82 connected to the primary oil chamber 37 is connected. The second control valve 55 is a pressure reducing valve which controls the hydraulic pressure in the second oil passage 82 and that in the primary oil chamber 37.

The second control valve 55 includes a discharge port 55c connected to the oil sump 57. The spool 55d of the second control valve 55 moves in the second control valve 55 to thereby open and close the inlet port 55a and the discharge port 55c. In this example, the spool 55d moves between a position to open the inlet port 55a and close the discharge port 55c (hereinafter referred to as an open position (the leftmost position in FIG. 3)) and a position to close the inlet port 55a and open the discharge port 55c (hereinafter referred to as a close position (the rightmost position in FIG. 3)). When the spool 55d is arranged at the open position, the inlet port 55a communicates with the input/output port 55b. Meanwhile, when the spool 55d is arranged at the close position, communication between the inlet port 55a and the input/output port 55b is restricted, and the input/output port 55b communicates with the discharge port 55c.

The second control valve 55 has a feedback chamber 55e to receive a feedback pressure of the second oil passage 82, and a signal pressure chamber 55f positioned on the opposite side from the feedback chamber 55e across the spool 55d. The hydraulic circuit 50 includes a solenoid valve 53 that works according to an electric current supplied from the transmission controller 4. The solenoid valve 53 is connected to the signal pressure chamber 55f through the oil passage 85. The solenoid valve 53 inputs, to the signal pressure chamber 55f, a signal pressure according to an electric current supplied from the transmission controller 4.

The second control valve 55 establishes communication between the inlet port 55a and the input/output port 55b or between the input/output port 55b and the discharge port 55c, to thereby control the hydraulic pressure in the second oil passage 82 and that in the primary oil chamber 37 (hereinafter referred to as a primary pressure). In detail, when the pressure in the feedback chamber 55e increases and the signal pressure from the solenoid valve 53 (that is, the pressure in the signal pressure chamber 55f) becomes relatively lower, the spool 55d is moved toward the close position, so that the input/output port 55b communicates with the discharge port 55c. Then, the hydraulic oil in the second oil passage 82 is discharged from the discharge port 55c, so that the hydraulic pressure in the second oil passage 82 and the primary pressure decrease. Meanwhile, when the pressure in the feedback chamber 55e decreases and the hydraulic pressure in the signal pressure chamber 55f becomes relatively higher, the spool 55d is moved toward the open position, so that the inlet port 55a communicates with the input/output port 55b. Then, the hydraulic oil in the first oil passage 81 flows into the second oil passage 82 through the second control valve 55, so that the hydraulic pressure in the second oil passage 82 and the primary pressure increase. As here described, the second control valve 55 controls the hydraulic pressure in the secondary oil passage 82 and the primary pressure according to the electric current output from the transmission controller 4, that is, the signal pressure from the solenoid valve 53.

Figure 4:
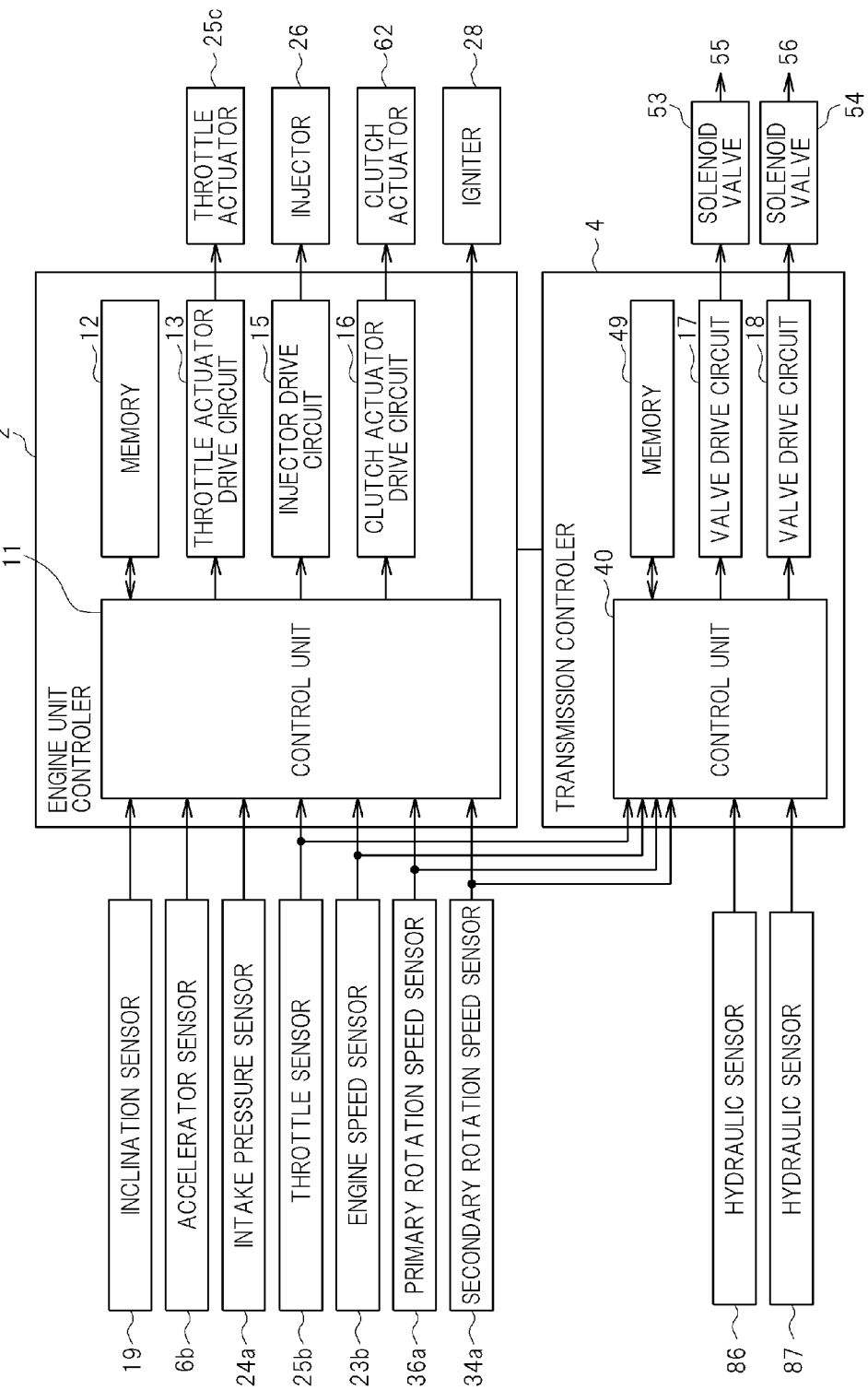
FIG. 4 is a block diagram showing a structure of an engine unit controller and a transmission controller included in a controller according to a preferred embodiment of the present invention.

FIG. 4 is a block diagram showing a structure of the engine unit controller 2 and the transmission controller 4 included in the controller 10.

As shown in FIG. 2 or FIG. 4, the handle 6 is provided with an accelerator sensor 6b to detect the amount of operation by a rider on the accelerator grip 6a (the rotation position of the accelerator grip 6a). The accelerator sensor 6b preferably is, e.g., a potentiometer, and outputs an electric signal according to the amount of operation by a rider. The intake pipe 24 is provided with an intake pressure sensor 24a to detect the air pressure in the intake pipe 24. The intake pressure sensor 24a includes, e.g., a semiconductor pressure sensor, and outputs an electric signal according to the air pressure in the intake pipe 24. The throttle body 25 is provided with a throttle sensor 25b to detect the throttle opening degree. The throttle sensor 25b preferably is, e.g., a potentiometer, and outputs an electric signal according to the throttle opening degree.

The engine 20 includes an engine speed sensor 23b to output a signal having a frequency according to the rotation speed of the crank shaft 23a. The continuously variable transmission 30 includes a primary rotation speed sensor 36a to output a signal having a frequency according to the rotation speed of the primary shaft 36. Further, the continuously variable transmission 30 includes a secondary rotation speed sensor 34a to output a signal having a frequency according to the rotation speed of the secondary shaft 34. Each of the engine speed sensor 23b, the primary rotation speed sensor 36a, and the secondary rotation speed sensor 34a preferably is, e.g., a rotation sensor using an electromagnetic pickup method.

As shown in FIG. 3 or FIG. 4, the first oil passage 81 is provided with a hydraulic sensor 86 to output an electric signal according to the hydraulic pressure in the first oil passage 81, and the second oil passage 82 is provided with a hydraulic sensor 87 to output an electric signal according to the hydraulic pressure in the second oil passage 82. The hydraulic sensors 86 and 87 preferably are respectively pressure sensors including, e.g., a diaphragm or a piezo-element.

Further, the motorcycle 1 includes an inclination sensor 19 to detect inclination of the vehicle body in the left-right direction. For example, the inclination sensor 19 preferably is an acceleration sensor. When the vehicle body is inclined in the left-right direction and thus the up-down direction of the vehicle body deviates from the vertical direction, a portion of the gravity is applied to the vehicle body in the left-right direction (the portion of the gravity will be hereinafter referred to as a left and right gravity component). The inclination sensor 19 outputs an electric signal according to a left and right gravity component.

The engine unit controller 2 includes a memory 12 including a RAM (Random Access Memory) or a ROM (Read Only Memory) and a control unit 11 including a microprocessor. A program to be executed by the control unit 11 and a map to be used in processing by the control unit 11 are stored in advance in the memory 12.

Further, the engine unit controller 2 includes a throttle actuator drive circuit 13, an injector drive circuit 15, and a clutch actuator drive circuit 16. The throttle actuator drive circuit 13 supplies, to the throttle actuator 25c, power according to a signal input from the control unit 11. According to a signal input from the control unit 11, the injector drive circuit 15 supplies a drive power to a solenoid constituting the injector 26. The amount of fuel injected by the injector 26, that is, an injection period of time of the injector 26 is controlled by the control unit 11. The clutch actuator drive circuit 16 is a circuit to supply, to the clutch actuator 62, power according to a signal input from the control unit 11. The clutch actuator drive circuit 16 activates the clutch actuator 62 according to a signal from the control unit 11 to thereby engage or disengage the clutch 61. Further, an igniter 28 to apply a high voltage to the ignition plug 29 is connected to the engine unit controller 2. The igniter 28 applies a high voltage to the ignition plug 29 at a time according to an output signal from the control unit 11.

The control unit 11 receives output signals from the engine speed sensor 23b, the primary rotation speed sensor 36a, and the secondary rotation speed sensor 34a, then calculates, based on the output signals from these sensors, the engine rotation speed, the rotation speed of the primary shaft 36 (hereinafter referred to as a primary rotation speed), the rotation speed of the secondary shaft 34 (hereinafter referred to as a secondary rotation speed), and the vehicle speed. The control unit 11 further receives output signals from the accelerator sensor 6b, the throttle sensor 25b, and the intake pressure sensor 24a, and controls, based on these output signals, the amount of operation on the accelerator grip 6a by a rider (hereinafter referred to as an accelerator operation amount), the throttle opening degree, and the intake pressure. As to be described later, the control unit 11 controls the engine 20 and the clutch 61, based on a driving state of the motorcycle 1 detected by these sensors. The control unit 11 further receives an output signal from the inclination sensor 19, and detects the inclination degree of the vehicle body in the left and right directions, based on the output signal.

The transmission controller 4 includes a memory 49 including a RAM and a ROM, and a control unit 40 including a microprocessor, to execute a program stored in advance in the memory 49. Besides a program to be executed by the control unit 40, a map and a threshold for use in processing by the control unit 40 are stored in advance in the memory 49.

The transmission controller 4 further includes valve drive circuits 17, 18. The valve drive circuit 17 supplies an electric current according to a signal input from the control unit 40 to the solenoid valve 53. Then, the second control valve 55 works such that the pressure in the second oil passage 82 and the primary pressure become equal to a pressure according to a signal from the control unit 40. Meanwhile, the valve drive circuit 18 supplies an electric current according to a signal input from the control unit 40 to the solenoid valve 54. Then, the first control valve 56 works such that the line pressure, that is, the hydraulic pressure of the first oil passage 81, and the secondary pressure become equal to a pressure according to a signal from the control unit 40.

Output signals from the engine speed sensor 23b, the primary rotation speed sensor 36a, and the secondary rotation speed sensor 34a are input to the control unit 40 as well, which calculates the engine rotation speed or the like, based on the output signals from these sensors. Further, the control unit 40 calculates the transmission ratio of the continuously variable transmission 30, based on the thus calculated primary rotation speed and secondary rotation speed. Further, the control unit 40 receives output signals from the hydraulic sensors 86, 87 and the throttle sensor 25b, and detects the primary pressure, that is, the hydraulic pressure of the primary oil chamber 37, and the secondary pressure, that is, the hydraulic pressure of the secondary oil chamber 38, and the throttle opening degree, based on the output signals from these sensors.

The control unit 40 controls the continuously variable transmission 30 based on the data detected by the above described sensors. In this preferred embodiment, the control unit 40 carries out a control to discharge air-mixed hydraulic oil from the oil passage. In detail, when inclination of the vehicle body in the left-right direction becomes larger, such as when the motorcycle 1 is laid down, the surface of the hydraulic oil in the oil sump 57 slants. As a result, the inlet 58a of the oil pump 58 emerges out of the hydraulic oil, and then the oil pump 58 sucks air, so that the air is immixed into the hydraulic oil. The control unit 40 carries out control to discharge the air-mixed hydraulic oil from the first oil passage 81.

The engine unit controller 2 and the transmission controller 4 are connected to each other through a bus, and each of these controllers notifies its operating state of the other. In this preferred embodiment, the engine unit controller 2 determines, based on an output signal from the inclination sensor 19, whether or not the inclination of the vehicle body in the left-right direction exceeds a predetermined threshold (hereinafter referred to as an inclination determination threshold). Then, upon determination that the inclination of the vehicle body in the left-right direction exceeds the inclination determination threshold, the engine unit controller 2 notifies the transmission controller 4 of that excess.

Figure 5:
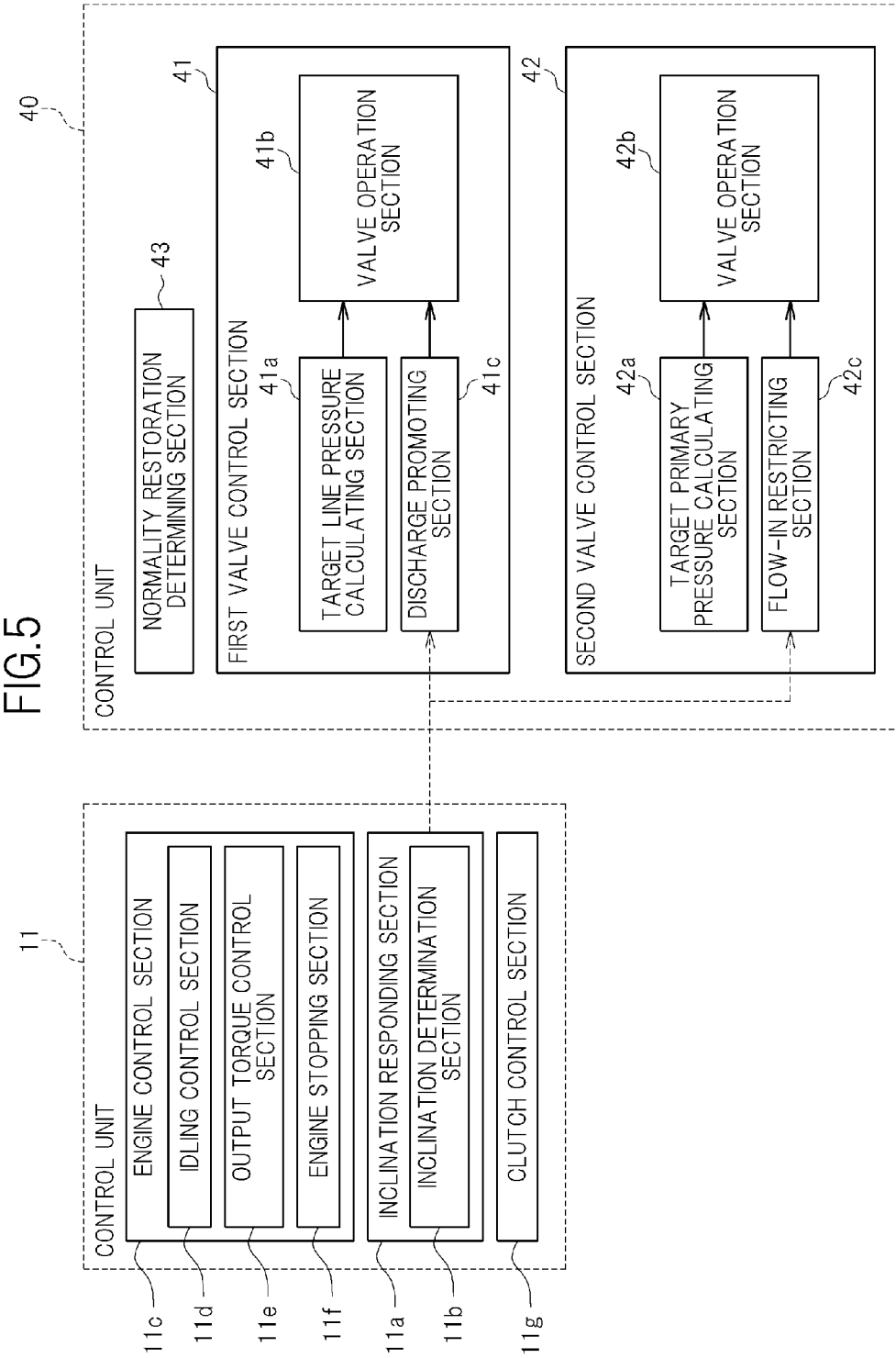
FIG. 5 is a functional block diagram of a control unit of the transmission controller and a control unit of the engine unit controller.

A processing carried out by the control unit 40 of the transmission controller 4 will be described. FIG. 5 is a functional block diagram of a processing carried out by the control unit 40 and the control unit 11. As shown in the diagram, the control unit 40 functionally includes a first valve control section 41 to control the first control valve 56, a second valve control section 42 to control the second control valve 55, and a normality restoration determining section 43.

The first valve control section 41 carries out control, as normal control, to operate the first control valve 56 based on a driving state detected by the above described sensor. Specifically, in the normal control, the first valve control section 41 sets a target pressure according to a driving state of the vehicle for the line pressure (the target pressure will be hereinafter referred to as a target line pressure Pl-tg), and outputs a signal according to the target line pressure Pl-tg to the valve drive circuit 18. In this example, the first oil passage 81 is connected to the secondary oil chamber 38, and in the normal control, the first valve control section 41 sets, as the target line pressure Pl-tg, a hydraulic pressure that will not cause slip of the belt 33. The first control valve 56 opens and closes the discharge port 56b according to the target line pressure Pl-tg. That is, the first control valve 56 opens and closes the discharge port 56b such that the actual line pressure (hereinafter referred to as an actual line pressure Pl) becomes equal to the target line pressure Pl-tg.

When it is determined that the inclination of the vehicle body exceeds the inclination determination threshold in the processing by the engine unit controller 2, the first valve control section 41 operates the first control valve 56 such that the discharge port 56b of the first control valve 56 is restricted from being closed (this operation will be hereinafter referred to as discharge promoting control). Specifically, the first valve control section 41 sets the target line pressure Pl-tg so as to restrict the discharge port 56b from being closed. This control facilitates discharge of the hydraulic oil from the discharge port 56b, compared to a case in which normal control is carried out, and accordingly, a period of time necessary to discharge air-mixed hydraulic oil from the first oil passage 81 can be reduced.

Note that the inclination determination threshold here is the inclination degree of the vehicle body laid down on a road. As to be described later, the engine unit controller 2 stops driving the engine 20 upon determination that the inclination of the vehicle body exceeds the inclination determination threshold. When driving the engine 20 is stopped due to inclining of the vehicle body, and then resumed (that is, at first starting of the engine after being stopped (hereinafter referred to as first driving after inclining)), the first valve control section 41 carries out the discharge promoting control.

In the following, a processing carried out by the first valve control section 41 will be described in detail. As shown in FIG. 5, the first valve control section 41 includes a target line pressure calculating section 41a, a valve operating section 41b, and a discharge promoting section 41c.

In the normal control, the target line pressure calculating section 41a calculates the target line pressure Pl-tg according to the driving state of the vehicle. For example, the target line pressure calculating section 41a calculates a clamping force of the secondary pulley 32 that will avoid slip of the belt 33 (a force with which the movable sheave 32a and the stationary sheave 32b sandwich the belt 33 (hereinafter referred to as a target secondary clamping force Fs)), based on a torque output from the engine 20 (hereinafter referred to as an engine torque T) and the actual transmission ratio of the continuously variable transmission 30 (hereinafter referred to as an actual transmission ratio Rt). Then, the target line pressure calculating section 41a determines a pressure corresponding to the target secondary clamping force Fs as the target line pressure Pl-tg. In this regard, the target line pressure calculating section 41a calculates an engine torque T, based on, e.g., the throttle opening degree detected on the basis on the output signal from the throttle sensor 25b (hereinafter referred to as a throttle opening degree Th) and an engine rotation speed calculated based on an output signal from the engine speed sensor 23b (hereinafter referred to as an engine rotation speed Espd). Further, the target line pressure calculating section 41a calculates the actual transmission ratio Rt, based on the primary rotation speed calculated based on an output signal from the primary rotation speed sensor 36a (hereinafter referred to as a primary rotation speed Pspd) and the secondary rotation speed calculated based on an output signal of the secondary rotation speed sensor (hereinafter referred to as a secondary rotation speed Sspd).

The valve operating section 41b operates the first control valve 56 such that the actual line pressure Pl becomes equal to the target line pressure Pl-tg. Specifically, the valve operating section 41b outputs a command value corresponding to the target line pressure Pl-tg to the valve drive circuit 18. In this regard, the valve operating section 41b may carry out feedback control to adjust the command value such that the actual line pressure Pl becomes equal to the target line pressure Pl-tg. The valve drive circuit 17 supplies an electric current according to the command value to the solenoid valve 53. A signal pressure according to the command value is input to the signal pressure chamber 56e of the first control valve 56. When a high pressure is set as the target line pressure Pl-tg, a high signal pressure is output from the solenoid valve 53. As a result, the spool 56c is moved toward the close position, so that the actual line pressure Pl and the secondary pressure increase. Meanwhile, when a low pressure is set for the target line pressure Pl-tg, a low signal pressure is output from the solenoid valve 53. As a result, the spool 56c is moved toward the open position, so that the actual line pressure Pl and the secondary pressure decrease.

The discharge promoting section 41c carries out the discharge promoting control described above. In detail, the discharge promoting section 41c sets the target line pressure Pl-tg such that the discharge port 56b is restricted from being closed. For example, the discharge promoting section 41c sets the target line pressure Pl-tg to the predetermined minimum value (hereinafter referred to as a discharge promoting pressure Plmin). The discharge promoting pressure Plmin is the minimum pressure necessary for the first oil passage 81 and the secondary oil chamber 38 and is much lower than the target line pressure Pl-tg which the target line pressure calculating section 41a calculates in a normal idling state of the engine 2 or in a start of the engine 2 before the idling state. The discharge promoting pressure Plmin may be the minimum value of the target line pressure Pl-tg that can be set in a processing of the target line pressure calculating section 41a. In the discharge promoting control, the valve operating section 41b outputs a command value according to the discharge promoting pressure Plmin, so that the first control valve 56 works such that the actual line pressure Pl becomes equal to the discharge promoting pressure Plmin. As the discharge promoting pressure Plmin is set at a small value, as described above, the spool 56c is moved toward the open position under the discharge promoting control, which facilitates discharge of the hydraulic oil from the first oil passage 81.

Note that, a processing carried out by the discharge promoting section 41c is not limited to the process described above. For example, the discharge promoting section 41c may update the target line pressure Pl-tg, based on the actual line pressure Pl. For example, the discharge promoting section 41c may update the target line pressure Pl-tg to be a value lower than the actual line pressure Pl by a predetermined value (hereinafter referred to as the minimum difference pressure ΔPlmin). That is, the discharge promoting section 41c may set, as the target line pressure Pl-tg, a value obtained by subtracting the minimum difference pressure ΔPlmin from the actual line pressure Pl. In this case as well, the spool 56c is moved toward the open position, so that the hydraulic oil can be resultantly readily discharged from the first oil passage 81.

Further, the discharge promoting section 41c may correct the target line pressure Pl-tg calculated by the target line pressure calculating section 41a such that the discharge port 56b is prevented from being closed. For example, the discharge promoting section 41c subtracts a predetermined value from the target line pressure Pl-tg calculated by the target line pressure calculating section 41a to set the resultant value as a final target line pressure Pl-tg.

The second valve control section 42 will be described. The second valve control section 42 carries out control, as normal control, to operate the second control valve 55 based on a driving state of the vehicle detected by the sensor described above. In this example, the second control valve 55 has the inlet port 55a connected to the first oil passage 81 and the input/output port 55b connected to the second oil passage 82 connected to the primary oil chamber 37. In the normal control, the second valve control section 42 sets, for the primary pressure, a target pressure according to a driving state of the vehicle (the target pressure will be hereinafter referred to as a target primary pressure Pp-tg). Then, the second valve control section 42 outputs a signal according to the target primary pressure Pp-tg to the valve drive circuit 17. The second control valve 55 changes ports communicating with each other, according to the target primary pressure Pp-tg set as described above. That is, the second control valve 55 establishes communication between the inlet port 55a and the input/output port 55b or between the input/output port 55b and the discharge port 55c such that the actual primary pressure (hereinafter referred to as an actual primary pressure Pp) becomes equal to the target primary pressure Pp-tg.

Further, upon determination that the inclination of the vehicle body exceeds the inclination determination threshold, the second valve control section 42 carries out flow-in restricting control to operate the second control valve 55 so as to restrict communication between the inlet port 55a and the input/output port 55b. That is, the second valve control section 42 sets the target primary pressure Pp-tg such that communication between the inlet port 55a and the input/output port 55b is restricted. With this control, the air-mixed hydraulic oil caused by inclining of the vehicle body can be restricted from flowing into the second oil passage 82 and the oil chamber 37. In this regard, similar to the first valve control section 41, the second valve control section 42 carries out the flow-in restricting control at the time of first driving after inclining.

A processing to be carried out by the second valve control section 42 will be described in detail. As shown in FIG. 5, the second valve control section 42 includes a target primary pressure calculating section 42a, a valve operating section 42b, and a flow-in restricting section 42c.

The target primary pressure calculating section 42a calculates the target primary pressure Pp-tg according to a driving state of the vehicle. Specifically, the target primary pressure calculating section 42a calculates a transmission ratio (hereinafter referred to as a target transmission ratio Rt-tg), based on the driving state of the vehicle, and then calculates the target primary pressure Pp-tg, based on the target transmission ratio Rt-tg.

For example, the target primary pressure calculating section 42a calculates a clamping force of the primary pulley 31 necessary to maintain the transmission ratio (a force with which the movable sheave 31a and the stationary sheave 31b sandwich the belt 33 (hereinafter referred to as a transmission maintaining clamping force Fpk)). Further, the target primary pressure calculating section 42a calculates the target transmission ratio Rt-tg, based on the throttle opening degree Th and the secondary rotation speed Sspd, and then calculates a transmission speed, based on the target transmission ratio Rt-tg and the actual transmission ratio Rt (the transmission speed will be hereinafter referred to as a transmission speed Drt). Then, the target primary pressure calculating section 42a adds or subtracts a force according to the transmission speed Drt to/from the transmission maintaining clamping force Fpk to thereby calculate a clamping force necessary for transmission (hereinafter referred to as a target primary clamping force Fp). Then, the target primary pressure calculating section 42a sets, as the target primary pressure Pp-tg, a pressure corresponding to the target primary clamping force Fp. Note that the transmission maintaining clamping force Fpk is calculated, based on, e.g., a thrust force ratio corresponding to the actual transmission ratio Rt (the thrust force ratio here is a ratio between the clamping force of the primary pulley 31 and that of the secondary pulley 32) and the actual clamping force of the secondary pulley 32.

The valve operating section 42b operates the first control valve 56 such that the actual primary pressure Pp becomes equal to the target primary pressure Pp-tg. That is, the valve operating section 42b outputs a command value corresponding to the target primary pressure Pp-tg to the valve drive circuit 17. In this regard, the valve operating section 42b may carry out feedback control to adjust the command value such that the actual primary pressure Pp becomes equal to the target primary pressure Pp-tg. The valve drive circuit 17 supplies an electric current according to the command value to the solenoid valve 53. A signal pressure according to the command value is input from the solenoid valve 53 to the signal pressure chamber 55f of the second control valve 55. When a high pressure is set as the target primary pressure Pp-tg, a high signal pressure is output from the solenoid valve 53. As a result, the spool 55d is moved toward the open position, so that the primary pressure Pp and the hydraulic pressure of the second oil passage 82 increase. Meanwhile, when a low pressure is set as the target primary pressure Pp-tg, a low signal pressure is output from the solenoid valve 54. As a result, the spool 55d is moved toward the close position, so that the actual primary pressure Pp and the hydraulic pressure of the second oil passage 82 decrease.

The flow-in restricting section 42c carries out the flow-in restricting control described above. That is, the flow-in restricting section 42c sets the target primary pressure Pp-tg such that communication between the inlet port 55a and the input/output port 55b is restricted. For example, the flow-in restricting section 42c sets the target primary pressure Pp-tg to a predetermined value (hereinafter referred to as a flow-in restricting pressure Ppmin). For example, the flow-in restricting pressure Ppmin is the minimum pressure necessary for the second oil passage 82 and the primary oil chamber 37 and much lower than a target primary pressure Pp-tg which the target primary pressure calculating section 42a calculates in the normal idling state of the engine 2 or during a start of the engine 2 before the idling state. Further, the flow-in restricting pressure Ppmin may be the minimum value of the target primary pressure Pp-tg that can be set in a processing carried out by the target primary pressure calculating section 42a. In the flow-in restricting control, as the valve operating section 42b outputs a command value according to the flow-in restricting pressure Ppmin, the second control valve 55 works such that the actual primary pressure Pp becomes equal to the flow-in restricting pressure Ppmin. As the flow-in restricting pressure Ppmin is a small value such as is described above, the spool 55d is moved toward the close position in the flow-in restricting control, so that the hydraulic oil can be restricted from flowing through the second control valve 55 to the second oil passage 82 and the primary oil chamber 37.

Note that a processing carried out by the flow-in restricting section 42c is not limited to the described above. For example, the flow-in restricting section 42c may update the target primary pressure Pp-tg, based on the actual primary pressure Pp. In detail, the flow-in restricting section 42c may update the target primary pressure Pp-tg such that the target primary pressure Pp-tg becomes lower than the actual primary pressure Pp by a predetermined value (hereinafter referred to as the minimum difference pressure ΔPpmin). That is, the flow-in restricting section 42c may set, as the target primary pressure Pp-tg, a value obtained by subtracting the minimum difference pressure ΔPpmin from the actual primary pressure Pp. In this case as well, the spool 55d is moved toward the close position, and the hydraulic oil is prevented from flowing into the second oil passage 82 and the primary oil chamber 37.

Further, the flow-in restricting section 42c may correct the target primary pressure Pp-tg calculated by the target primary pressure calculating section 42a. For example, the flow-in restricting section 42c may subtract a predetermined value from the target primary pressure Pp-tg calculated by the primary pressure calculating section 42a to set the resultant value as the final target primary pressure Pp-tg.

The normality restoration determining section 43 determines whether or not the state of the hydraulic circuit 50 satisfies a predetermined condition (hereinafter referred to as a restoration condition). The restoration condition is such that, for example, the actual line pressure Pl exceeds a predetermined threshold (hereinafter referred to as a restoration determination pressure Pth). The normality restoration determining section 43 detects the actual line pressure Pl, based on an output signal from the hydraulic sensor 86, to determine whether or not the actual line pressure Pl exceeds the restoration determination pressure Pth. The restoration determination pressure Pth is, e.g., the discharge promoting pressure Plmin described above. The normality restoration determining section 43 determines whether or not the actual line pressure Pl reaches the discharge promoting pressure Plmin set by the discharge promoting section 41c as the target line pressure Pl-tg.

When it is determined that the actual line pressure Pl exceeds the restoration determination pressure Pth, the first valve control section 41 and the second valve control section 42 stop the discharge promoting control and the flow-in restricting control, and begin the normal control so as to control the first control valve 56 and the second control valve 55 with a target pressure according to the driving state of the vehicle. In this regard, as to be described later, while the discharge promoting control is carried out, the engine unit controller 2 carries out operation to increase the amount of the hydraulic oil supplied from the oil pump 58 so as to increase the engine rotation speed. When it is determined that the actual line pressure Pl exceeds the restoration determination pressure Pth, that is, when the discharge promoting control is to be terminated, the control unit 40 notifies the engine unit controller 2 of the termination. At the time, the engine unit controller 2 terminates the control so as to increase the amount of the hydraulic oil supplied from the oil pump 58.

A processing carried out by the control unit 11 of the engine unit controller 2 will be described. As shown in FIG. 5, the control unit 11 functionally includes an inclination responding section 11a, an engine control section 11c, and a clutch control section 11g. The inclination responding section 11a includes an inclination determination section 11b. Further, the engine control section 11c includes an idling control section 11d, an output torque control section 11e, and an engine stopping section 11f.

The inclination determination section 11b determines whether or not the inclination of the vehicle body exceeds the inclination determination threshold. Specifically, the inclination determination section 11b determines, based on the left and right gravity component detected by the inclination sensor 19, whether or not the inclination of the vehicle body exceeds the inclination determination threshold. The inclination determination threshold is, e.g., a threshold relating to the left and right gravity component. In this case, the inclination determination section 11b determines whether or not the left and right gravity component detected by the inclination sensor 19 exceeds the inclination determination threshold. Further, the inclination determination threshold may be a threshold relating to an inclination angle of the vehicle body (the inclination angle is an angle between the vertical direction and the up-down direction of the vehicle body or an angle between the horizontal direction and the left-right direction of the vehicle body). In this case, the inclination determination section 11b calculates the inclination angle of the vehicle body, based on the left and right gravity component detected by the inclination sensor 19. Then, the inclination determination section 11b determines whether or not the inclination angle of the vehicle body exceeds the inclination determination threshold.

When the inclination of the vehicle body exceeds the inclination determination threshold, the inclination responding section 11a stores information indicating the excess in the memory 12 (the information will be hereinafter referred to as excessive inclination information). Further, the inclination responding section 11a sends the excessive inclination information to the transmission controller 4 to thereby notify the transmission controller 4 of the fact that the inclination of the vehicle body exceeds the inclination determination threshold.

As to be described later, when it is determined that the inclination of the vehicle body exceeds the inclination determination threshold, the engine control section 11c immediately stops driving the engine 20. The control unit 40 of the transmission controller 4 detects, at the time of first driving after inclining, based on the excessive inclination information, whether or not the inclination of the vehicle body exceeded the inclination determination threshold in the previous driving. For example, upon receipt of the excessive inclination information from the engine unit controller 2, the control unit 40 stores the excessive inclination information in the memory 49. After that, when a rider turns on the main switch of the vehicle to activate the transmission controller 4, the control unit 40 determines whether or not the excessive inclination information is stored in the memory 49. When the excessive inclination information is stored in the memory 49, the control unit 40 determines that the inclination of the vehicle body exceeded the inclination determination threshold in the previous driving. In this case, the control unit 40 carries out the above described discharge promoting control and flow-in restricting control.

In this regard, when it is determined that the inclination of the vehicle body exceeded the inclination determination threshold, the inclination responding section 11a may tentatively store the excessive inclination information in the memory 12, and further sends the excessive inclination information to the transmission controller 4 at the time of first driving after inclining.

The engine control section 11c controls the engine 20, based on the driving state detected by the above described sensor. Specifically, the idling control section 11d controls the engine rotation speed of the engine 20 in the idling state of the engine 20. For example, referring to a map (hereinafter referred to as an idling control map) or a calculation formula stored in advance in the memory 12, the idling control section 11d calculates the target engine rotation speed, based on the state of the engine 20 (e.g., the temperature of cooling water of the engine 20). Then, the idling control section 11d controls the amount of air to be supplied to the engine 20 such that the engine rotation speed Espd becomes equal to the target engine rotation speed. That is, the idling control section 11d outputs a command value according to the target engine rotation speed to the throttle actuator drive circuit 13. With the above, the throttle valve 25a is set to an angle according to the command value.

Further, while the discharge promoting control is carried out, the idling control section 11d increases the supply amount of hydraulic oil by the oil pump 58. Specifically, in an idling state, the idling control section 11d carries out control to increase the engine rotation speed. That is, the idling control section 11d controls the engine 20 such that the engine rotation speed becomes faster in an idling state under the discharge promoting control, compared to that in an idling state under the normal control. For example, referring to the above described idling control map, the idling control section 11d calculates the target engine rotation speed, based on the state of the engine 20. Then, the idling control section 11d carries out a correction, such as adding a predetermined value to the target engine rotation speed calculated as described above, to thereby determine the corrected value as the final target engine rotation speed.

In this regard, there is a structure in which a dedicated valve to control the engine rotation speed in an idling state (that is, an idle control valve) is arranged in the intake path extending to the cylinder 21. In such a structure, the idling control section 11d may operate the idle control valve such that the engine rotation speed Espd becomes equal to the target engine rotation speed.

The output torque control section 11e controls the torque output from the engine 20. For example, the output torque control section 11e carries out throttle control to control the throttle opening degree, based on the accelerator operation amount determined by the accelerator sensor 6b (the accelerator operation amount will be hereinafter referred to as an accelerator operation amount Acc). Specifically, the output torque control section 11e calculates a throttle opening degree corresponding to the accelerator operation amount Acc (hereinafter referred to as a target throttle opening degree), and operates the throttle actuator 25c such that the throttle opening degree Th coincides with the target throttle opening degree.

Further, while the discharge promoting control and the flow-in restricting control are carried out in the transmission controller 4, the output torque control section 11e carries out control to reduce the torque input from the engine 20 to the continuously variable transmission 30 (the control will be hereinafter referred to as a torque reducing control). For example, in the torque reducing control, the output torque control section 11e sets the throttle opening degree to a predetermined value, without carrying out the throttle control based on the accelerator operation amount Acc described above. In this regard, in a structure in which the above described idle control valve is arranged in the intake path extending to the cylinder 21 in addition to the throttle valve 25a, the output torque control section 11e may set the throttle opening degree to 0% under the torque reducing control.

Further, the output torque control section 11e may carry out injection amount control to control the amount of fuel injected by the injector 26, based on the intake pressure (hereinafter referred to as an intake pressure Pin) detected by the intake pressure sensor 24a and the engine rotation speed Espd. For example, the output torque control section 11e may calculate the amount of injected fuel based on the intake pressure Pin and the engine rotation speed Espd, and output a command value to the injector drive circuit 15 so that the injector 26 injects the fuel of the calculated amount. Further, while the discharge promoting control is carried out, the output torque control section 11e may carry out torque reducing control to operate the injector 26 such that the amount of fuel injected by the injector 26 is kept at a predetermined amount, without carrying out the injection amount control based on the intake pressure Pin or the like.

When it is determined that the inclination of the vehicle body exceeds the inclination determination threshold in the inclination determination section 11b, the engine stopping section 11f immediately stops driving the engine 20. For example, the engine stopping section 11f stops fuel injection by the injector 26, and stops applying voltage from the igniter 28 to the ignition plug 29.

The clutch control section 11g controls the clutch 61 based on the driving state of the vehicle. For example, the clutch control section 11g drives the clutch actuator 62, based on the difference between the engine rotation speed Espd and the primary rotation speed Pspd, to thereby engage or disengage the clutch 61.

In this example, the clutch control section 11g controls the clutch 61 such that torque transmission to the continuously variable transmission 30 is prevented while the discharge promoting control is carried out in the transmission controller 4. That is, the clutch control section 11g keeps the clutch 61 disengaged while the discharge promoting control is carried out.

Figure 6:
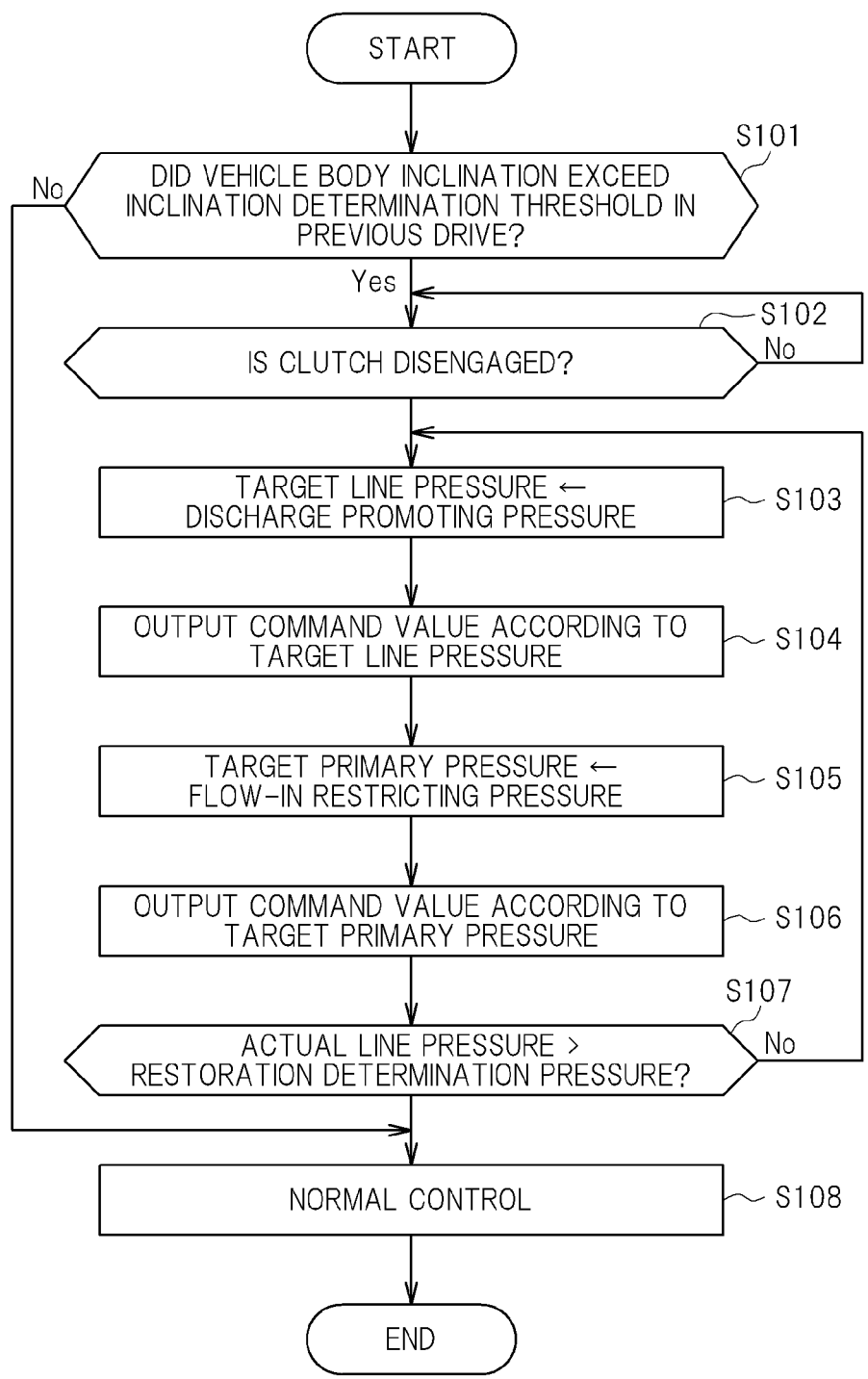
FIG. 6 is a flowchart of an example processing carried out by the control unit of the transmission controller.
Figure 7:
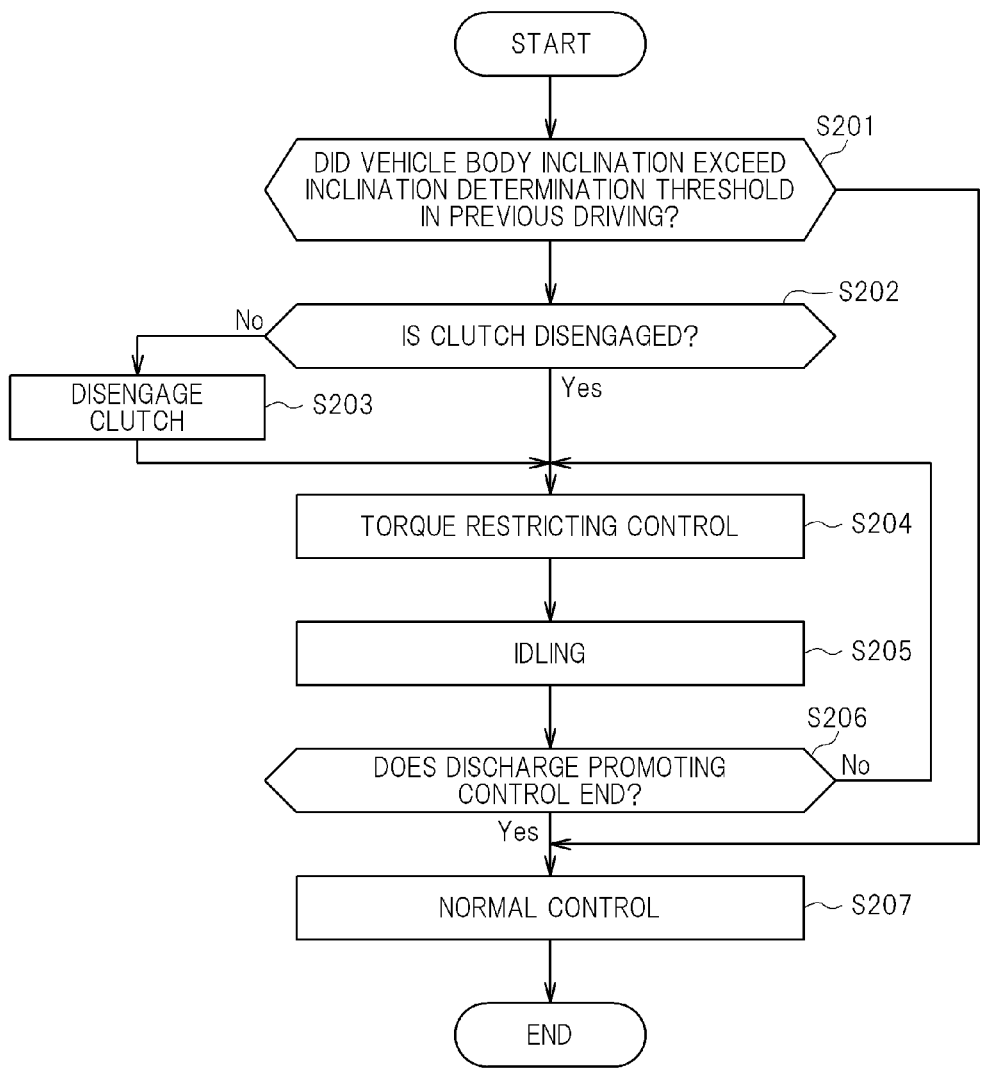
FIG. 7 is a flowchart of an example processing carried out by the control unit of the engine unit controller.

Below, a flow of a processing carried out by the transmission controller 4 and the engine unit controller 2 will be described. FIG. 6 is a flowchart of an example processing carried out by the control unit 40 of the transmission controller 4 when starting the engine 20. FIG. 7 is a flowchart of an example processing carried out by the control unit 11 of the engine unit controller 2 when starting the engine 20.

With reference to FIG. 6, a processing carried out by the control unit 40 will be described. When the transmission controller 4 is activated, the control unit 40 initially determines whether or not the inclination of the vehicle body exceeded the inclination determination threshold in the previous driving (S101). Specifically, as described above, the control unit 40 determines whether or not the excessive inclination information has been received from the engine unit controller 2. When it is determined that the inclination of the vehicle body exceeded the inclination determination threshold in the previous driving, the control unit 40 determines whether or not the clutch 61 is disengaged (S102). In this regard, when the clutch 61 is disengaged, the first valve control section 41 carries out the discharge promoting control, and the second valve control section 42 carries out the flow-in restricting control.

That is, the discharge promoting section 41c sets the discharge promoting pressure Plmin as the target line pressure Pl-tg (S103). Then, the valve operating section 41b outputs a command value according to the discharge promoting pressure Plmin to the valve drive circuit 18 (S104). As a result, the spool 56c of the first control valve 56 is moved toward the open position, so that the hydraulic oil can be readily discharged from the first oil passage 81.

Further, the flow-in restricting section 42c sets the flow-in restricting pressure Ppmin as the target primary pressure Pp-tg (S105). Then, the valve operating section 42b outputs a command value according to the flow-in restricting pressure Ppmin to the valve drive circuit 17 (S106). As a result, the spool 55d is moved toward the close position in the second control valve 55, so that the air-mixed hydraulic oil is prevented from flowing into the second oil passage 82 and the primary oil chamber 37 through the second control valve 55.

Thereafter, the normality restoration determining section 43 determines, based on an output signal from the hydraulic sensor 86, whether or not the air-mixed hydraulic oil has been duly discharged from the first oil passage 81. Specifically, the normality restoration determining section 43 determines whether or not the actual line pressure Pl has exceeded the restoration determination pressure Pth described above (e.g., the discharge promoting pressure Plmin set as the target line pressure Pl-tg) (S107). The control unit 40 carries out the processing at S103 to S107 until the actual line pressure Pl exceeds the restoration determination pressure Pth.

In the processing at S107, when the actual line pressure Pl exceeds the restoration determination pressure Pth, the first valve control section 41 and the second valve control section 42 stop the discharge promoting control and the flow-in restricting control, respectively, and start the normal control to set the target line pressure Pl-tg the target primary pressure Pp-tg each according to the driving state detected by the sensor (S108).

In this regard, when the actual line pressure Pl exceeds the restoration determination pressure Pth, the control unit 40 sends information indicating the excess (hereinafter referred to as restoration notice information) to the engine unit controller 2. Further at S101, when the inclination of the vehicle body did not exceed the inclination determination threshold in the previous driving, the control unit 40 starts the normal control without carrying out the discharge promoting control and the flow-in restricting control (S108).

In the following, a processing carried out by the control unit 11 of the engine unit controller 2 will be described. As shown in FIG. 7, when the engine unit controller 2 is activated, initially, the inclination responding section 11a determines whether or not the inclination of the vehicle body exceeded the inclination determination threshold in the previous driving (S201). Specifically, the inclination responding section 11a determines whether or not the excessive inclination information is stored in the memory 12. When the inclination of the vehicle body exceeded the inclination determination threshold in the previous driving, the clutch control section 11g determines whether or not the clutch 61 remains disengaged (S202). When the clutch 61 is not disengaged, the clutch control section 11g activates the clutch actuator 62 to disengage the clutch 61 (S203). As described above, after disengagement of the clutch 61, the transmission controller 4 starts the discharge promoting control and the flow-in restricting control.

Meanwhile, at S203, when the clutch 61 is disengaged, the output torque control section 11e starts the torque reducing control (S204). Specifically, the output torque control section 11e sets the throttle opening degree to a predetermined value, and maintains the amount of fuel injected from the injector 26 at a predetermined amount. Further, the idling control section 11d increases the target engine rotation speed to thereby increase the actual engine rotation speed (S205).

Thereafter, the control unit 11 determines whether or not the transmission controller 4 has terminated the discharge promoting control (S206). Specifically, the control unit 11 determines whether or not the above described restoration notice information has been received from the transmission controller 4. When the discharge promoting control is not yet terminated, the control unit 11 returns to the processing at S204, and carries out again the processing thereafter.

Meanwhile, at the determination at S205, when the discharge promoting control has been terminated, the control unit 11 starts the normal control (S207). Specifically, the output torque control section 11e terminates the torque reducing control, and starts the throttle control based on the accelerator operation amount Acc and the injection amount control based on the intake pressure Pin. Further, the idling control section 11d returns the target engine rotation speed to a value in the normal idling state.

Figure 8:
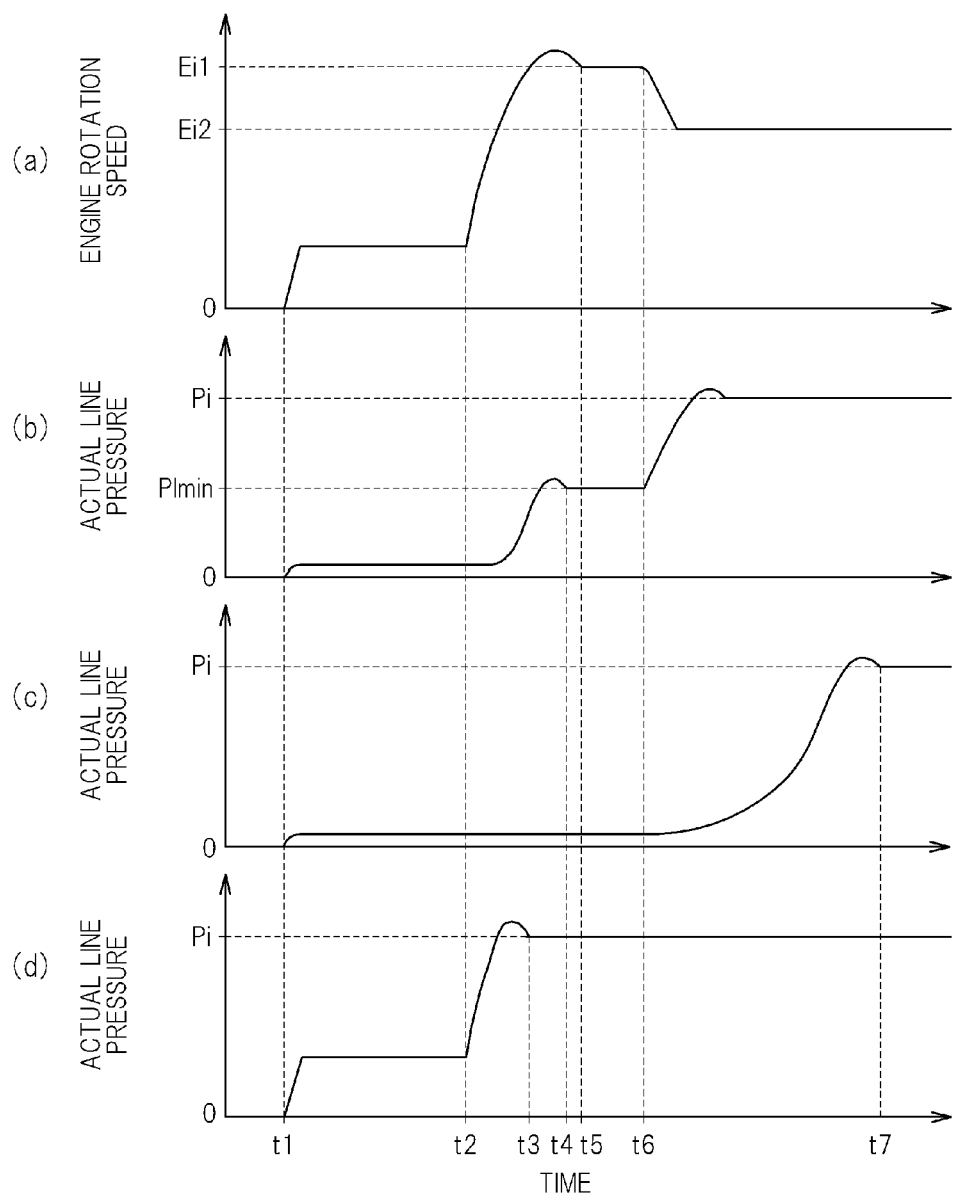
FIGS. 8A-8D are diagrams illustrating changes in line pressure when discharge promoting control is carried out.

FIGS. 8A-8D are time charts illustrating changes in hydraulic pressure under the discharge promoting control. FIG. 8A shows changes in the engine rotation speed at the time of first driving after inclining (that is, at the time of first starting of the engine 20 after being stopped due to inclining of the vehicle body). FIG. 8B shows changes in the actual line pressure when the above described discharge promoting control is carried out at the time of first driving after inclining. Further, FIG. 8C shows changes in the actual line pressure when the normal control, rather than the discharge acceleration control, is carried out at the time of first driving after inclining. Further, FIG. 8D shows changes in the actual line pressure at the normal start (that is, at the time of starting the vehicle after being stopped not due to inclining of the vehicle body).

As shown in FIG. 8A, when the starter motor is activated and the engine 20 starts cranking at time t1, the engine rotation speed increases. Thereafter, after the engine 20 drives autonomously at time t2, the engine rotation speed slightly jumps up before reaching the idling rotation speed Ei1. After that, the engine rotation speed reaches an engine rotation speed in the idling state at time t5. As described above, when the inclination of the vehicle body exceeded the inclination determination threshold in the previous driving, the idling control section 11d controls the engine 20 such that the engine rotation speed becomes faster than that in the normal state. Therefore, the idling rotation speed Ei1 is faster than the idling rotation speed Ei2 in the normal state.

As shown in FIG. 8D, when the engine 20 starts cranking at the normal starting, the actual line pressure increases along with the increase of the engine rotation speed (t1). Thereafter, after the engine 20 drives autonomously at time t2, the actual line pressure reaches the target line pressure set by the target line pressure calculating section 41a, based on the engine torque or the like in the idling state (hereinafter referred to as a target line pressure Pi) (t3).

Meanwhile, as shown in FIG. 8C, in a starting after the inclination of the vehicle body exceeded the inclination determination threshold, although the engine 20 starts cranking at time t1 and the engine rotation speed increases, increase of the actual line pressure is restricted due to the air immixed in the hydraulic oil. In FIG. 8C as well, because the target line pressure calculating section 41a sets the target line pressure Pi, based on the engine torque or the like in the idling state, the actual line pressure reaches the target line pressure Pi at time t7. In the above case, because a target line pressure Pi is set to a high pressure set in the normal idling state, the spool 56c in the first control valve 56 is moved toward the close position in order to increase the actual line pressure toward the target line pressure Pi. As a result, time t7 at which the actual line pressure reaches the target line pressure Pi is remarkably delayed from time t3 shown in FIG. 8D, at which the actual line pressure reaches the target line pressure Pi.

In FIG. 8B where the discharge promoting control is carried out, similar to FIG. 8C, the actual line pressure is prevented from increasing in a period immediately after the start of cranking because the air is immixed in the hydraulic oil. In the above, the discharge promoting pressure Plmin, that is, the predetermined minimum value, is set as the target line pressure under the discharge promoting control. As a result, in FIG. 8B, the actual line pressure reaches the discharge promoting pressure Plmin at time t4. Further, in the above, because the discharge promoting pressure Plmin lower than the target line pressure Pi is set as the target line pressure, the spool 56c is moved toward the open position than its position in the case shown in FIG. 8D. As a result, the air-mixed hydraulic oil is discharged from the first oil passage 81 between time t1 to time t4. Thereafter, the determination by the normality restoration determining section 43 is carried out. After it is determined that the actual line pressure has reached the restoration determination pressure Pth (the discharge promoting pressure Plmin here), the target line pressure calculating section 41a sets the target line pressure Pi as the target line pressure (t6). As a result, the actual line pressure increases towards the target line pressure Pi. In this regard, as described above, the idling control section 11d returns the target engine rotation speed to the value Ei2 in the normal idling state when the discharge promoting control ends. Therefore, as shown in FIG. 8A, the idling rotation speed starts decreasing after time t6 toward the normal idling rotation speed Ei2.

In the above described motorcycle 1, the control to operate the first control valve 56 based on the driving state of the vehicle is preferably carried out as the normal control. On the other hand, the discharge promoting control is preferably carried out when it is determined that the inclination of the vehicle body exceeds the inclination determination threshold. In the discharge promoting control, the first control valve 56 works so as to prevent the discharge port 56b from being closed. The above processing is effective to shorten a period in which air-mixed hydraulic oil stays in the first oil passage 81.

Further, in the motorcycle 1, the first control valve 56 preferably opens and closes the discharge port 56b according to the target line pressure set for the hydraulic pressure of the first oil passage 81, that is, the line pressure, by the transmission controller 4. Then, in the discharge promoting control, the transmission controller 4 preferably sets the target line pressure Pl-tg such that the discharge port 56b is restricted from being closed. With the above, a period in which air-mixed hydraulic oil stays in the first oil passage 81 can be shortened using a simple process.

Further, the transmission controller 4 preferably sets the target line pressure Pl-tg in the normal control according to a driving state of the vehicle, and preferably sets a predetermined value as the target pressure in the discharge promoting control. With the above, a period in which air-mixed hydraulic oil stays in the first oil passage 81 can be shortened using an even simpler process.

Further, in the motorcycle 1, the first control valve 56 preferably is a relief valve including the inlet port 56a capable of communication with the discharge port 56b and receiving hydraulic oil from the first oil passage 81. With the above, the hydraulic oil received through the inlet port 56a can be smoothly discharged through the discharge port 56b.

Further, the motorcycle 1 preferably includes a second control valve 55, different from the first control valve 56, that includes an inlet port 55a connected to the first oil passage 81 connected to the oil pump 58, and the input/output port 55b connected to the second oil passage 82 connected to the primary oil chamber 37. Further, when the inclination of the vehicle body exceeds the inclination determination threshold, the transmission controller 4 operates the second control valve 55 such that communication between the inlet port 55a and the input/output port 55b is prevented. With the above, it is possible to prevent air-mixed hydraulic oil from flowing into the second oil passage 82 and the primary oil chamber 37.

Further, in the motorcycle 1, the second control valve 55 preferably is a value that establishes communication between the input/output port 55b and the inlet port 55a according to the target primary pressure set by the transmission controller 4 for the hydraulic pressure of the second oil passage 82, that is, the primary pressure. Then, when it is determined that the inclination of the vehicle body exceeds the inclination determination threshold, the transmission controller 4 sets the target primary pressure Pp-tg so as to restrict communication between the inlet port 55a and the output port 55b. With the above, it is possible to restrict air-mixed hydraulic oil from flowing into the second oil passage 82 and the primary oil chamber 37, using a simple process.

Further, in the motorcycle 1, the oil pump 58 is preferably arranged to operate along with the rotation of the engine 20, and the engine unit controller 2 increases the engine rotation speed while the discharge promoting control is carried out. With the above, hydraulic oil supplied from the oil pump 58 increases while the discharge promoting control is carried out. As a result, hydraulic oil discharged from the discharge port 56b increases. Accordingly, a period of time necessary to discharge the air-mixed hydraulic oil is effectively further reduced.

Further, in the motorcycle 1, the engine unit controller 2 preferably carries out control to reduce the torque input from the engine 20 to the continuously variable transmission 30 while carrying out the discharge promoting control. With the above, it is possible to reduce occurrence of slip of the belt 33 while the discharge promoting control is carried out.

Further, the engine unit controller 2 preferably controls the clutch 61 such that torque transmission to the continuously variable transmission 30 is prevented while the discharge promoting control is carried out. With the above, it is possible to reduce occurrence of slip of the belt 33 while the discharge promoting control is carried out.

Note that the present invention is not limited to the above described motorcycle 1 and various modifications are possible. For example, the first control valve 56 arranged to discharge hydraulic oil from the first oil passage 81 preferably is a relief valve, for example. However, the first control valve 56 may be a pressure reducing valve having a discharge port to discharge hydraulic oil from the first oil passage 81 and decrease the hydraulic pressure of the first oil passage 81. In this case as well, the transmission controller 4 controls the pressure reducing valve such that the discharge port of the pressure reducing valve is prevented from being closed when the inclination of the vehicle body exceeds the inclination determination threshold. For example, the transmission controller 4 sets a target pressure for the hydraulic pressure in the oil passage on the downstream of pressure reducing valve (the oil passage connected to the secondary oil chamber 38) such that the hydraulic pressure of the oil passage on the downstream decreases.

Further, the first control valve 56 may be a switching valve including a discharge port to discharge hydraulic oil from the first oil passage 81. In this case as well, the control unit 40 controls the switching valve such that the discharge port of the switching valve is prevented from being closed when the inclination of the vehicle body exceeds the inclination determination threshold.

Further, in the above description, the second valve control section 42 carries out the flow-in restricting control to operate the second control valve 55 such that communication between the inlet port 55a and the input/output port 55b is prevented while the first valve control section 41 carries out the discharge promoting control. However, the second valve control section 42 may carry out the normal control to operate the second control valve 55 based on the driving state of the vehicle, without carrying out the flow-in restricting control.

Further, in the above description, under the discharge promoting control, the discharge promoting section 41c sets the target line pressure Pl-tg, and the valve operating section 41b operates the first control valve 56, according to the target line pressure Pl-tg set by the discharge promoting section 41c. However, the discharge promoting section 41c instead of the valve operating section 41b may output a predetermined minimum command value to the valve drive circuit 18. In such control as well, the first control valve 56 operates to prevent the discharge port 56b from being closed.

Further, under the flow-in restricting control, the flow-in restricting section 42c sets the target primary pressure Pp-tg. However, the flow-in restricting section 42c instead of the valve operating section 42b may output a predetermined minimum command value to the valve drive circuit 17.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motorcycle comprising:
an engine;
a continuously variable transmission including a primary pulley including a first oil chamber and sandwiching a belt due to hydraulic pressure in the first oil chamber and receiving torque from the engine, and a secondary pulley including a second oil chamber and sandwiching the belt due to hydraulic pressure in the second oil chamber and receiving the torque from the primary pulley;
an oil pump to feed hydraulic oil to the first oil chamber and to the second oil chamber;
a valve including a discharge port to discharge the hydraulic oil from an oil passage connected to the oil pump to at least one of the first and second oil chambers, the valve arranged to open and close the discharge port; and
a controller to perform an upright posture control to operate the valve based on a driving state of the motorcycle; wherein
the controller includes an inclination determination section to determine whether or not inclination of the motorcycle exceeds a predetermined threshold, and when the inclination of the motorcycle exceeds the predetermined threshold, the controller performs a discharge promoting control to operate the valve such that the discharge port is prevented from being closed.

2. The motorcycle according to claim 1, wherein the valve opens and closes the discharge port according to a target pressure set by the controller as a hydraulic pressure of the at least one of the first and second oil chambers, and during the discharge promoting control, the controller sets the target pressure so that the discharge port is prevented from being closed.

3. The motorcycle according to claim 2, wherein the controller sets the target pressure according to the driving state of the motorcycle under the upright posture control, and sets a predetermined value as the target pressure under the discharge promoting control.

4. The motorcycle according to claim 1, wherein the valve is a relief valve which includes an inlet port that communicates with the discharge port and receives the hydraulic oil from the oil passage.

5. The motorcycle according to claim 1, further comprising a second valve, different from the valve, including an inlet port connected to a first oil passage connected to the oil pump and an input/output port connected to a second oil passage connected to either one of the first and second oil chambers, wherein when the inclination of the motorcycle exceeds the predetermined threshold, the controller operates the second valve such that communication between the inlet port and the input/output port is prevented.

6. The motorcycle according to claim 5, wherein the second valve establishes the communication between the input/output port and the inlet port according to the target pressure which the controller sets for the hydraulic pressure of the second oil passage; and
the controller sets the target pressure so as to prevent the communication between the inlet port and the input/output port when the inclination of the motorcycle exceeds the predetermined threshold.

7. The motorcycle according to claim 1, wherein the oil pump operates along with rotation of the engine, and the controller performs a control to increase a rotation speed of the engine when performing the discharge promoting control.

8. The motorcycle according to claim 7, further comprising:
a clutch to transmit or to prevent transmission of torque from the engine to the continuously variable transmission; wherein
the controller controls the clutch so as to prevent the transmission of the torque to the continuously variable transmission when performing the discharge promoting control.

9. The motorcycle according to claim 1, wherein the controller performs control to reduce torque input from the engine to the continuously variable transmission when performing the discharge promoting control.

* * * * *